Nov. 21, 1950  J. L. GRUNDON  2,530,460
FRICTION CLUTCH UNIT
Filed Nov. 26, 1947  3 Sheets-Sheet 1
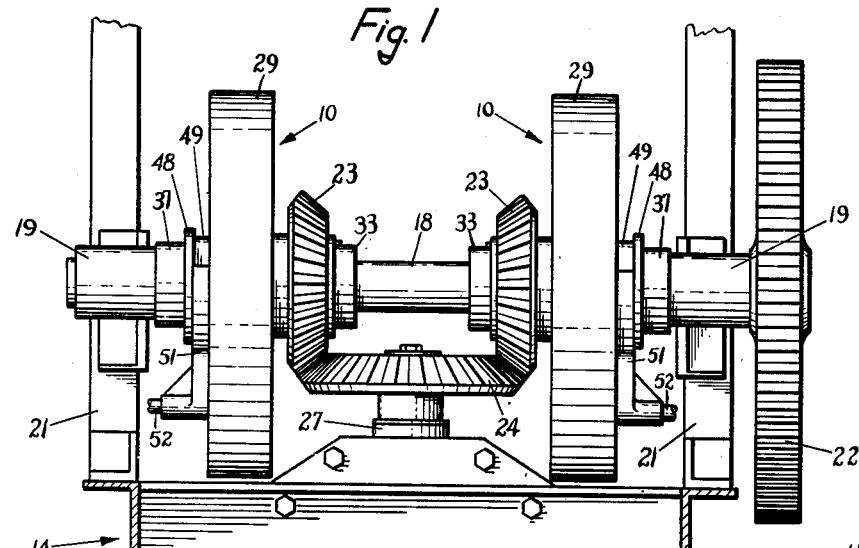
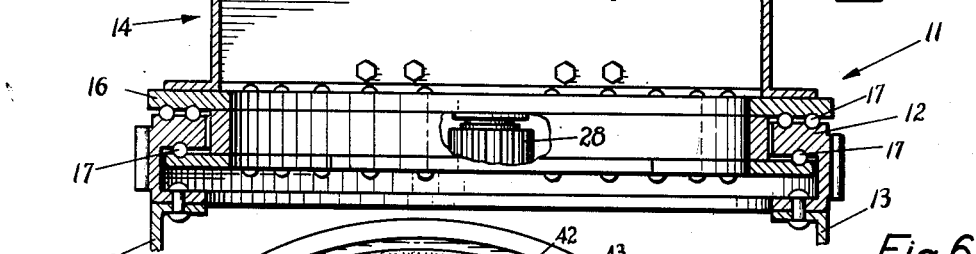
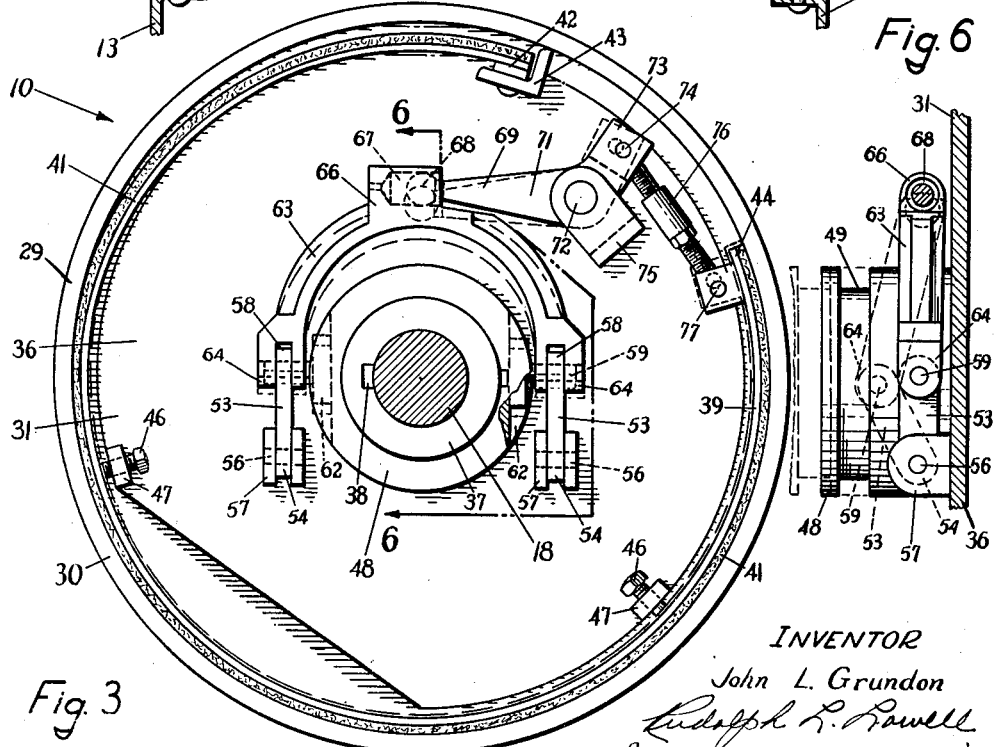
INVENTOR
John L. Grundon
By Rudolph L. Lowell
atty

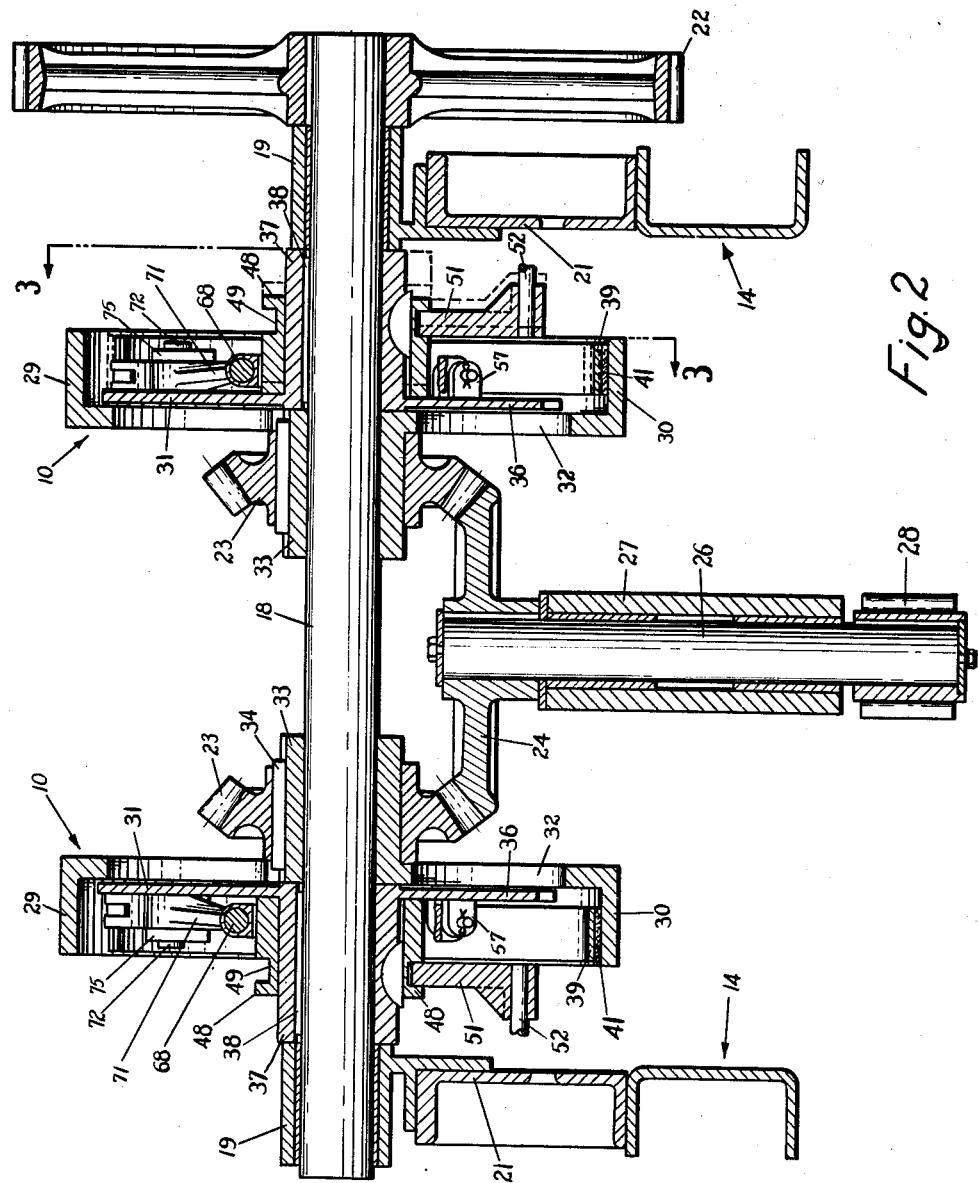

Nov. 21, 1950   J. L. GRUNDON   2,530,460
FRICTION CLUTCH UNIT
Filed Nov. 26, 1947   3 Sheets-Sheet 3
Fig. 4
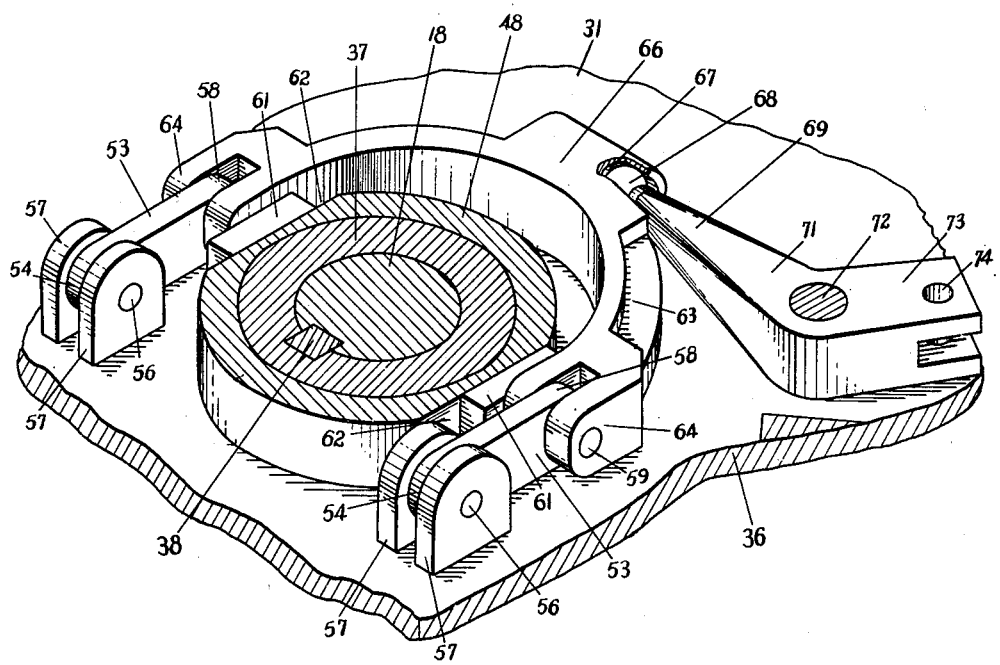
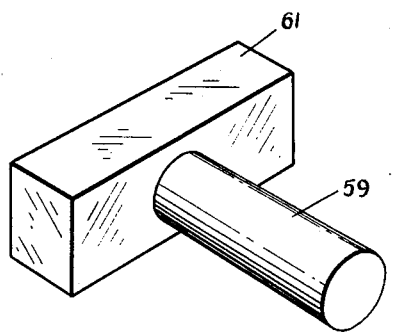
Fig. 5
INVENTOR
John L. Grundon
Rudolph L. Lowell
By   Atty.

Patented Nov. 21, 1950

2,530,460

UNITED STATES PATENT OFFICE 2,530,460

FRICTION CLUTCH UNIT

John L. Grundon, Des Moines, Iowa

Application November 26, 1947, Serial No. 788,258

2 Claims. (Cl. 74—99)

This invention relates generally to friction clutch units and in particular to a friction clutch for controlling the rotatable movement of the cab for a portable crane or the like.

An object of this invention is to provide an improved friction clutch unit.

Another object of this invention is to provide a friction clutch unit adapted to positively connect heavy duty power shafts with a minimum clutch actuating effort.

Still another object of this invention is to provide a friction clutch unit for heavy duty work which is of a compact and rugged construction, efficient in operation, and having all of the parts thereof readily accessible for service and maintenance purposes.

A feature of this invention is found in the provision of a friction clutch unit in which a driven member of a dish shape is adapted to receive within its peripheral wall a driving member having a disc section and a hub section. Mounted about the disc section is a resilient friction band adapted to be moved into frictional engagement with the inner surface of the driven member's peripheral wall. The band is secured at one end to the disc section and has its opposite end free for movement relative to the disc section. A clutch operating member axially movable on the hub section, is movably connected with the free end of the friction band by means including a rockable bell crank and a lever member having one end connected with the bell crank in a lost motion connection, and an opposite end connected with the operating member for pivotal movement about an axis transverse of the operating member and for linear movement normal to such axis. On axial movement of the operating member the free end of the friction band is moved relative to the disc section to releasably engage and disengage the friction band with the driven member, with the bell crank being arranged so as to compound the clutch actuating force applied on the operating member.

Further objects, features and advantages of this invention will become apparent from the following description when taken in connection with the accompanying drawings, in which:

Fig. 1 is a front elevational view of a turntable unit for a portable crane, with some parts broken away and other parts shown in section, illustrated in assembly relation with a pair of the clutch units of this invention;

Fig. 2 is an enlarged vertical longitudinal sectional view of the clutch assembly shown in Fig. 1;

Fig. 3 is an enlarged transverse sectional view taken along the line 3—3 in Fig. 2;

Fig. 4 is an enlarged fragmentary perspective detail view of a lever system forming part of the actuating mechanism for the clutch of this invention;

Fig. 5 is a perspective detail view of a pin member embodied in the lever system illustrated in Fig. 4, and enlarged relative to its showing in Fig. 4; and Fig. 6 is a fragmentary sectional view taken on the line 6—6 in Fig. 3.

With reference to the drawings, a pair of the clutch units of this invention, indicated generally as 10, are shown in Fig. 1 in assembly relation with a turntable unit 11 for a portable crane or the like. The turntable unit includes a stationary ring gear 12 mounted on frame members 13 forming part of a portable frame for the crane. A rotatable frame, designated as 14, and adapted to support a cab, a power unit and a hoist apparatus (none of which are shown) is mounted on a ring structure 16 which is rotatably supported on the ring gear 12 by means including ball bearings 17.

The friction clutch units 10 comprise part of a clutch assembly for reversibly rotating the frame 14 relative to the ring gear 12. This clutch assembly includes a horizontal drive shaft 18 (Figs 1 and 2) rotatably supported at its opposite ends in bearings 19 which are mounted on frame members 21 forming part of the rotatable frame 14. Power is applied to the shaft 18 from the crane power unit through a transmission system which includes a gear 22 mounted at one end of the shaft 18. A pair of the clutch units 10 are utilized in the clutch assembly and are arranged on the shaft 18 at positions adjacent to the inner sides of the shaft bearings 19.

Mounted on the shaft 18, between the clutch units 10, are a pair of bevel gears 23 which are operatively associated with an adjacent clutch unit 10 in a manner to be hereinafter fully described.

The gears 23 are in continuous engagement with a common bevel gear 24 mounted on the upper end of a vertical shaft 26 carried in a bearing 27, and having a pinion gear 28 at its lower end. The bearing 27 is suitably supported on the rotatable frame 14 and the vertical shaft 26 is arranged to provide for a continuous engagement of the pinion gear 28 with the ring gear 12.

The power shaft 18 is continuously rotated in one direction and the bevel gears 23 are engageable with opposite sides of the common bevel gear 24. On an alternate actuation of the clutch units 10, therefore, the bevel gear 24 is driven in opposite directions to in turn provide for a reversed rotation of the pinion gear 28. As a result the gear 28 is capable of travel in reversed directions about the ring gear 12 to provide for a reversed rotation of the rotatable frame 14 about the ring gear.

Since the clutch units 10 are of a like construction and similarly assembled relative to the power shaft 18 and an associated bevel gear 23, only one of the clutch units 10 will be described in detail.

The clutch unit 10 (Fig. 2) includes a driven member 29 and a driving member 31. The driven member 29 is of a substantially dish shape with a back wall 32 of an open frame construction provided with a hub 33 and a peripheral flange or rim 30 which extends laterally therefrom in a direction away from the hub. The hub 33 is freely rotatable on the shaft 18 and the bevel gear 23 is keyed on the hub as shown at 34.

The driving member 31 is formed with a disc section 36 provided with a hub 37 which is keyed at 38 with the shaft 18. The disc 36 is receivable within the peripheral rim 30 of the driven member 29 and is arranged between the hubs 33 and 37.

Mounted about the disc 36 is a resilient band 39 (Figs. 2 and 3) provided with a friction lining 41. The band 39 is secured at one of its ends 42 to a laterally extended lug 43 on the disc section 36, while its opposite end 44 is free for movement relative to the disc. Adjustable screws 46 are carried in a spaced relation in lugs 47 provided on the disc 36 and act to hold the band member 39 in its extended position about the periphery of the disc section 36.

The disc 36 and band 39 are relatively arranged and constructed such that the lining 41 and the inner surface of the rim 30 constitute clutch surfaces adapted for releasable frictional engagement. Releasable engagement takes place on movement of the free end 44 of the band in a direction outwardly from the disc and away from the secured end 42 of the band to the full line position of the band shown in Fig. 3. A release of the frictional engagement, and in turn a disconnection of the driven member 29 from the driving member 31, takes place on movement of the band 39 to its dotted line position also shown in Fig. 3.

Movement of the friction band 39 to frictionally engage and disengage the driving member 31 and the driven member 29 is accomplished by the provision of means including a collar or clutch operating member 48 which is mounted on the hub 37 (Fig. 2). The collar 48 has an annular groove 49 near its outer end for slidably receiving a yoke 51 which is manually actuated to move the collar 48 axially of the hub 37 by means including an actuating lever 52.

A pair of links 53 (Figs. 3 and 4) are arranged at opposite sides of the collar 48 and are pivotally supported at one of their ends 54 on pins 56 which are carried between pairs of lugs or ears 57 extended laterally from the disc section 36 of the driving member 31. The opposite ends 58 of the links 53 are pivotally supported on pins 59 (Figs. 4 and 5) formed with head members 61 of a rectangular shape. The heads 61 are slidably received within a pair of oppositely arranged transverse grooves 62 formed in the collar member 48.

A U-shape lever 63 (Figs. 3 and 4) is arranged in a straddling relation about the collar 48 and has its free ends of a bifurcated construction for receiving the link ends 58 between the bifurcations 64. The pins 59 extend through the bifurcations 64 to pivotally connect the lever 63 with the links 53. The base end 66 of the U-lever 63 is formed with a socket 67 adapted to receive in a lost motion connection a ball 68 formed at the free end of a long arm 69 of a bell crank 71, which is pivotally supported on a pin 72 extended laterally from the disc section 36 and supported in part by an L-shape lug 75 secured to the disc section.

It is seen, therefore, that the bell crank 71 is pivotally or rockably supported for movement in a path parallel to the plane of the disc section 36 and normal to the axis of the shaft 18. A short arm 73 of the bell crank 71 has its free end pivotally connected at 74 to one end of an adjustable link 76. The opposite end of the link 76 is pivotally connected at 77 with the free end 44 of the resilient band 39.

In the operation of the clutch unit assume the parts to be relatively arranged as shown in full lines in Figs. 3 and 6, in which the friction band 39 is in frictional engagement with the peripheral rim 30 to connect the driving member 31 with the driven member 29. On axial movement of the collar 48 outwardly away from the disc section 36, the links 53 are pivotally moved about their ends 54 laterally outwardly from the disc section 36 concurrently with a slidable movement of the pin heads 61 upwardly from their full line positions shown in Fig. 3, to their dotted line positions shown in the same figure. This concurrent movement of the links 53 and pins 59 provides for an outward movement of the bifurcations 64 of the U-lever 63 and a corresponding downward movement of its base end 66, as shown in dotted lines in Fig. 6, whereby the bell crank 71 is pivotally moved in a counter-clockwise direction, as viewed in Fig. 3. This rockable movement of the bell crank 71, to its position illustrated in dotted lines in Fig. 3, acts through the link 76 to move the friction band 39 out of frictional engagement with the peripheral rim 30.

On an axial movement of the collar 48 toward the disc section 36, the clutch actuating lever system, above described, functions in reverse directions to force the friction band 39 against the peripheral wall 30 to releasably engage the driven member 29 with the driving member 31.

In this actuation of the clutch unit 10 the ball 68 on the long arm 69 of the bell crank 71, moves longitudinally within the socket 67 to provide a lost motion connection between the bell crank 71 and the U-shape lever 63. It will be noted further that by virtue of the relative arrangement of the bell crank arms 69 and 73, a compound leverage action is obtained in moving the brake band 39. Stated otherwise, the force applied on the collar 48 acts through the longer arm 69 to move the shorter arm 73 and in turn the brake band 39.

From a consideration of the above description, it is seen that the invention provides a clutch unit which is of a rugged and compact construction and in which all movable parts are readily available through the open side of the driven member 29 for maintenance and servicing purposes. Also, the clutch engaging surfaces 30 and 41 are relatively large and are capable of being moved into releasable frictional engagement quickly and with a relatively small force, so as to positively engage the driving and driven members. It will be appreciated that the inertia of the rotatable frame 14 is relatively great and a positive stopping and starting action thereof is necessary to an efficient overall operation of the crane.

Although the clutch units 10 have been described and illustrated with respect to the turntable unit of a crane, it is apparent that they can also be utilized and embodied as a part of the crane hoisting apparatus. Further, although the invention has been described and illustrated with respect to a preferred embodiment thereof, it is to be understood that it is not to be so limited since changes can be made therein which are within the full intended scope of this invention, as defined by the appended claims.

I claim:

1. A mechanism for actuating an operating member comprising, a rotatable collar member, means guiding said collar member for linear axial movement, a first pivoted lever supported for pivotal movement axially of said collar member, a second guide means movably connected with said collar member and said first lever means to retain said lever means against movement transversely of the pivotal path of movement thereof, a second lever pivotally supported intermediate its ends for pivotal movement in a path transversely of said collar member, means movably connecting one end of said second lever means with said operating member, and a lost-motion connection between the opposite end of said second lever means and the free end of said first lever means, with said operating member being actuated in response to the axial movement of said collar member.

2. A mechanism for actuating an operating member comprising, a rotatable collar member, means guiding said collar member for linear axial movement, a U-shape lever member arranged in a straddling relation about said collar member, a pair of links arranged at opposite sides of said collar member and pivotally supported at one of their ends for pivotal movement axially of said collar member, pivot means pivotally connecting the other ends of said links with the free ends of said U-member, means guidably supporting said pivot means on said collar member for movement transversely thereof, a bell crank pivotally supported for pivotal movement transversely of said collar member, a lost-motion connection between one arm of said bell crank and the base portion of said U-member, and means movably connecting the other arm of said bell crank with the operating member, with said operating member being actuated in response to the axial movement of said collar member.

JOHN L. GRUNDON.

REFERENCES CITED

The following references are of record in the file of this patent:

UNITED STATES PATENTS

| Number | Name | Date |
|---|---|---|
| 1,667,175 | Timbs | Apr. 24, 1928 |